Patented June 27, 1950

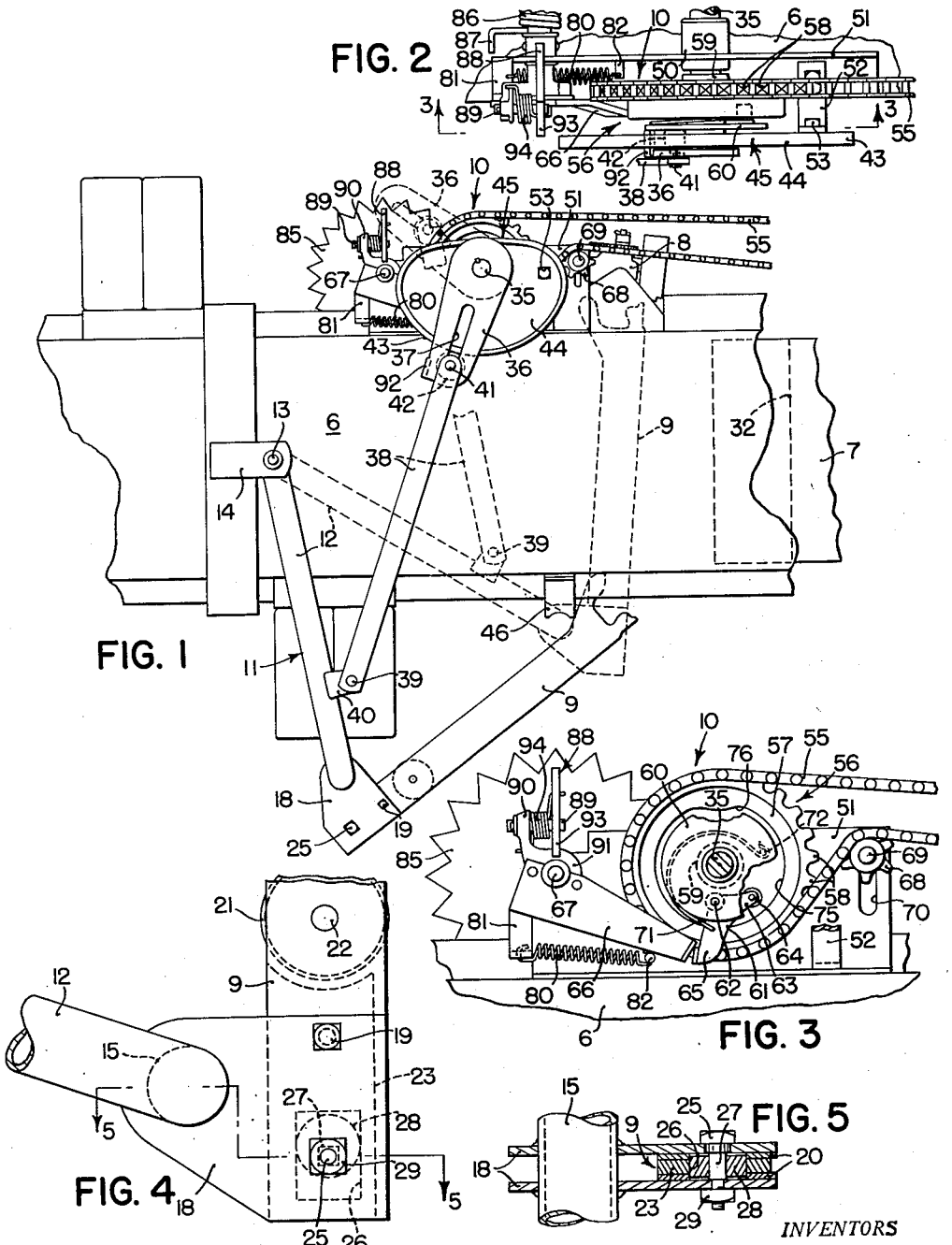

2,512,896

UNITED STATES PATENT OFFICE 2,512,896

AUTOMATIC BALING MECHANISM

George B. Hill and James Rex West, Ottumwa, Iowa, assignors to Deere Manufacturing Co., a corporation of Iowa Application June 8, 1945, Serial No. 598,363

4 Claims. (Cl. 100—20)

The present invention relates generally to automatic baling mechanism and more particularly to the needle which wraps the baling wire or other binding medium around the compressed bales of crops or other material, and to the mechanism which drives the needle.

The principal object of our invention relates to the provision of a needle operating mechanism that is smoother in operation and less expensive to manufacture. A further object relates to the provision of a novel and improved means for adjusting the needle angularly relative to its supporting arm, in order to adjust its alignment with the tying mechanism. Still another object relates to the provision of releasable means for holding the needle in adjusted position, but which readily releases to protect the needle against damage in case it is struck by the plunger of the baling mechanism.

These and other objects and advantages of our invention will be apparent to those skilled in the art after a consideration of the following description, in which reference is had to the drawings appended hereto, in which Figure 1 is an elevational view of a portion of a baling press, showing the needle and its operating mechanism.

Figure 2 is a top plan view of the mechanism for shifting the needle into and out of tying position, and drawn to an enlarged scale.

Figure 3 is a front elevational view, taken in section along the line 3—3 in Figure 2.

Figure 4 is a fragmentary elevational view showing the means for mounting the needle on its supporting arm, drawn to a larger scale than Figure 1, and Figure 5 is a top plan view taken in section along the line 5—5 in Figure 4.

Referring now to the drawings, the baling press includes a horizontally disposed baling chamber 6, of conventional design, within which a plunger 7 is shiftable toward the left, as viewed in Figure 1, to compress the material, such as hay, into a bale, in a manner well known to those skilled in the art. The plunger 7 reciprocates back and forth in the baling chamber 6 compressing charges of hay into the bale, and when a bale attains a predetermined length it is bound with baling wire by means of wire tying mechanism contained in a casing 8 on top of the bale case 6. The details of the wire tying mechanism are not included in this description, for the present invention is not concerned with this device but rather with the needle 9 and with its driving mechanism 10.

The needle 9 is carried on a supporting member in the form of a bail 11, having a pair of arms 12 pivotally mounted at 13 on a pair of brackets 14 on opposite sides of the bale case 6. The pivots 13 are coaxial and the arms 12 are interconnected by a horizontal portion 15 of the bail extending beneath the bale case 6.

As shown in Figure 1, when the needle is in its inactive position, retracted from the bale case 6, the upper end of the needle is retracted to a position beneath the bottom of the baling chamber. The needle is shiftable upwardly about the axis of the pivot 13, through the bale case 6 into the tying position, as indicated in dotted lines, with the upper end of the needle in cooperative relation with the tying mechanism 8. In this position, the needle has carried the baling wire up through the bale chamber to bring the ends together for tying purposes, and after the wires are tied the needle is retracted to its inactive position once more.

It is necessary to maintain an accurate angular relation between the needle 9 and the supporting arm 12 in order that the wire will be positioned properly for tying. To this end, we have provided a novel and improved mechanism for adjusting the needle 9 angularly relative to its supporting bail 11. A pair of supporting plates 18 are fixed to the horizontal portion 15 of the bail 11, preferably by welding, and are spaced apart to receive therebetween the needle 9, which is pivotally mounted between the plates 18 on a bolt 19 that extends through aligned apertures in the needle and the two plates.

The needle 9 comprises a pair of spaced plates or bars 20, between which is disposed a sheave 21 journaled on a pin 22, over which sheave the baling wire (not shown) is trained. Beneath the sheave 21, a filler plate 23 is secured by the bolt 19 to maintain the plates in spaced relation to permit rotation of the sheave.

An adjusting bolt 25 extends through aligned apertures in the two plates 18 in spaced relation to the pivot bolt 19, and through a slot 26 in the needle. The bolt 25 is provided with a square shank portion 27 on which is mounted an eccentric camming disk 28. The eccentric disk 28 is prevented from rotation relative to the bolt shank 27 by the square cross section of the latter, so that by turning the head of the bolt 25, the cam 28 can be rotated about the axis of the bolt. The cam disk 28 bears against the vertical sides of the slot 26, so that when the disk is moved about the axis of the bolt the needle is shifted angularly about the axis of the pivot bolt 19. Thus, the upper end of the needle 9 can be adjusted to proper alignment with the tying mechanism in the housing 8. The needle can be secured rigidly in adjusted position by tightening a nut 29 on the threaded end of the bolt 25.

The pivot bolt 19 also serves as a safety shear bolt, in case the plunger head 7 should ever engage the needle 9. This is not likely to happen when the needle and plunger are properly timed, for the plunger head is provided with a vertically extending slot 32 adapted to receive the needle 9 and to serve as a passageway up through which the needle moves from its inactive position to its tying position. However, in the event that the mechanism should be operated with the needle out of its normal timed relation with the plunger head 7, or in the event that some foreign object finds its way into the baling chamber, a blow against the needle 9 in a horizontal direction will shear the pivot bolt 19, and the needle will pivot about the axis of the adjusting bolt 25 to yield to the blow, thereby avoiding damage. The pivot bolt 19 is made of sufficiently small diameter to permit its being severed by the shearing action of the plates and the needle, while having sufficient strength to hold the needle for all normal operating purposes.

The needle is swung to its tying position by power delivered from an actuating shaft 35 on which is keyed an actuating arm 36 having a radially extending slot 37. A link 38 is pivotally connected at 39 with a bracket 40 welded to the arm 12, and the upper end of the link 38 is provided with a stub shaft 41, which extends through the slot 37 and which carries a roller 42 on its inner end.

The roller 42 engages the peripheral edge 43 of a stationary plate 44, through which the shaft 35 extends. Thus, the peripheral edge 43 serves as a cam or endless track surrounding the shaft 35 and serving to guide the roller 42.

When the shaft 35 is rotated through one revolution, the arm 36 will raise the link 38, thereby swinging the bail 11 upwardly and shifting the needle 9 upwardly through the bale case toward its tying position. The length of the arm 36 and link 38 are such that the needle reaches its tying position in less than a third of a revolution of the shaft 35, as indicated in dotted lines in Figure 1. The upper portion of the track 43 is flattened, so that for the next third of the revolution or slightly more, the needle 9 is held stationary in tying position to provide sufficient time for the tying mechanism to secure the binding wires and sever them. This flattened portion is indicated at 45 and is formed substantially on an arc drawn about the axis of the pivot 39 when the latter is in its raised or tying position, as indicated in dotted lines. In this position of the bail 11, the bottom portion 15 of the bail engages a resilient bumper 46 mounted on the lower portion of the bale case 6. While the roller 42 is passing over the flat portion 45 of the track 43, the stub shaft 41 slides inwardly through the slot 37, since the center of the flattened portion 45 is nearer the shaft 35 than is the remainder of the track. The weight of the bail 11 and needle 9 holds the roller 42 in rolling contact with the track portion 45.

The shaft 35 is supported in a bearing 50, which is mounted in a plate 51 standing vertically on the top of the bale case 6. The camming track member 44 is supported on the shaft 35 and also on a bracket 52, which is bolted at 53 to the track member 44 and rigidly fixed to the top of the bale case 6.

Power for driving the shaft 35 is obtained through a power-transmitting chain 55, which drives a one-revolution self-interrupting clutch device 56 comprising a continuously rotating element 57, having sprocket teeth 58 around the circumference thereof, and carried on a hub 59 journaled on the shaft 35. The intermittently rotatable element of the clutch comprises, in addition to the shaft 35 and the arm 36 mounted thereon outside of the track member 44, a clutch-dog supporting plate 60 fixed to the shaft 35 inside the track member 44. A clutch dog 61 is pivotally mounted on a pin 62 attached to the plate 60 and is in the form of a bell crank, one arm 63 of which carries a roller 64. The other arm 65 of the clutch dog 61 extends outwardly beyond the continuously rotating member 57 and engages a trip arm 66 mounted on a shaft 67 that is rockably supported for movement about an axis parallel to the shaft 35. Normally, the clutch member 57 is driven at a constant speed by the drive chain 55, which is trained around the sprocket teeth 58 and which extends to a suitable drive sprocket (not shown), mounted on the main crank shaft which drives the plunger 7. An idler sprocket 68 is journaled on a bolt 69 in vertically adjustable position in a slot 70 in the plate 51 for the purpose of adjusting the slack in the drive chain 55. The chain 55 drives the sprocket 58 in a clockwise direction as viewed in Figure 3, but when the trip arm 66 is swung downwardly in a clockwise direction to disengage the arm 65, the arm is turned in a clockwise direction about the mounting pin 62 by means of a spring 71 anchored to a pin 72 attached to the clutch dog plate 60. The spring 71 swings the roller 64 into engagement with an internal cylindrical track 75 inside the normally rotating clutch member 57 and having a hump or raised portion 76 against which the roller 64 engages when it is rolling on the track 75. The rotating member 57 thus drives the arm 36 through a complete revolution, actuating the needle supporting bail 11 and the wire tying mechanism in the housing 8, the wire tying mechanism being connected to the shaft 35 by means which is not an essential part of the present invention and therefore is not described herein. During the rotation of the arm 36 and shaft 35, the trip arm 66 is returned to its original position by means of a spring 80 connected between a lug 81 fixed to the arm 66 and a bolt 82 secured to the plate 51. At the completion of one revolution of the shaft 35, the trip arm 66 is engaged once again by the arm 65 of the dog 61, thereby rocking the latter to disengage the roller 64 from the hump 76. The clutch member 57 is synchronized with the movement of the plunger 7 within the bale case, through the drive chain 55, so that the hump 76 engages the dog 61 at the proper point in the cycle of the plunger 7. Thus, the trip arm 66 can be rocked at any time during the cycle of the baling plunger 7 without interfering with the timing of the wire tying mechanism.

The trip arm 66 is controlled by a measuring wheel 85 rotatably supported above the bale case 6 and extending through a slot in the top thereof to engage the bale being formed. The wheel 85 is journaled on the shaft 67 and rotates slowly as the bale is forced toward the left, as viewed in Figure 1, by the plunger head 7. The details of this tripping mechanism are not an essential part of the present invention and therefore are not disclosed herein in great detail. Briefly, the wheel 85 is connected to a coil spring 86 encircling the shaft 67 and having its outer end extending radially outwardly from the shaft and turned outwardly to form a finger 87 adapted to be moved by the measuring wheel 85 into engagement with a bell crank 88 mounted on a shaft 89, which is supported on an upwardly extending lug 90 fixed to the hub 91 on which the trip arm 66 is supported. When the spring finger 87 engages the bell crank 88, the movement of the wheel 85 is transmitted through the spring 86, finger 87, bell crank 88, and hub 91 to swing the trip arm 66 downwardly out of engagement with the dog arm 65, thereby starting a movement of the self-interrupting clutch 56. Then, as the arm 36 moves upwardly during the first portion of its revolution, an ear 92 welded to the end of the arm 36 engages an outwardly extending arm 93 on the bell crank 88, forcing the latter upwardly about the shaft 89 against the action of a coil spring 94 encircling the shaft 89 and thereby disengaging the bell crank 88 from the spring finger 87 and allowing the finger to spring past the bell crank 88 to release the trip arm 66 and prevent a second actuation of the tying mechanism.

Summarizing the operation of the preferred embodiment of our invention: When the bale being formed accumulates to the predetermined length, as measured by the measuring wheel 85, the spring finger 87 engages the bell crank 88 to swing the trip arm 66 downwardly out of engagement with the trip dog 61 in the self-interrupting clutch mechanism. This releases the trip dog 61 and allows the roller 64 to roll on the internal track 75 until it engages the hump 76 in the track, causing the trip dog 61 to move in a clockwise direction with the rotating member 57 of the clutch, thereby carrying with it the dog-supporting plate 60, the shaft 35 and the needle actuating arm 36. The arm 36 begins to rotate in a clockwise direction, as viewed in Figure 1, carrying with it the link 38, which swings the bail 11 upwardly about the axis of the pivot 13, raising the needle 9 into tying position. The roller 42 rolls upwardly along the periphery of the track member 44 and along the top surface 45 of the track, holding the needle in tying position until the roller moves off the left-hand end of the surface 45 so that the needle may return downwardly to its inactive position.

We claim:

1. In automatic baling mechanism having a support, a needle member shiftably mounted thereon for movement between tying and inactive positions, and a rotatable power shaft journaled on said support: means for transmitting power from said shaft to shift said needle member from inactive position to tying position, comprising a single link connected at one end directly to said needle member, and having a track follower on its other end; a stationary track member on the support, and provided with an opening through which the aforesaid power shaft projects; means providing a peripheral cam track on the track member, with which said follower is engaged, for guiding the latter in a closed path to effect a movement of said needle member into and out of tying position, said cam track having a flattened portion over which said follower travels when said needle member reaches tying position, causing the needle member to hesitate in said tying position to provide an appreciable length of time to tie the bale; and an arm fast on said power shaft and directly engageable with the follower end of the link for moving said follower around said track member.

2. In automatic baling mechanism having a support, a needle member shiftably mounted thereon for movement between tying and inactive positions, and a rotatable power shaft journaled on said support: means for transmitting power from said shaft to shift said needle member from inactive position to tying position, comprising a single link connected at one end directly to said needle member and having a track follower on its other end; a stationary track member having an outer face disposed generally radially with respect to the aforesaid power shaft, and through which face said shaft projects; means on said track member providing a peripheral cam track encircling said shaft and adapted to receive said track follower for guiding the latter thereabout in a closed path to effect a movement of said needle member into and out of tying position, said cam track having a flattened portion over which said follower travels when said needle member reaches tying position, causing the needle member to hesitate in said position to provide an appreciable length of time to tie the bale; an arm fast on said tying shaft adjacent the aforesaid outer face of the track member; and means including a slot radially along said arm for connecting the follower end of said link thereto, whereby said follower end of the link may move in said slot as the arm rotates with the power shaft to move said follower around said cam track.

3. The combination set forth in claim 2, including the further provision that said last named means comprises a pin carried by the follower end of said link and extending into said slot in the arm, said pin further carrying the follower.

4. In automatic baling mechanism having a support, a needle member shiftably mounted on said support by means providing for generally vertical movement thereof, and a horizontally disposed rotatable power shaft journaled on said support: means for transmitting power from said shaft to shift needle member upwardly from an inactive position to a raised tying position, comprising a single link having upper and lower ends and connected at its lower end to said needle member and having a track roller journaled on its upper end; stationary means with respect to which the power shaft is journaled including an endless cam track encircling the shaft and engaging said roller, the upper portion of said track being flattened to carry the roller substantially horizontally for holding said link and needle member in tying position for an appreciable portion of the travel of said roller around said track; an arm fast on said shaft and extending radially therefrom adjacent the cam track, and having a radially extending slot therein; and means on said link slidably engaging said slot, whereby one revolution of said shaft and arm acts through said link and roller to raise said needle member and the weight of the latter tends to hold said roller in contact with said flattened portion of the track.

GEORGE B. HILL.
JAMES REX WEST.

REFERENCES CITED

The following references are of record in the file of this patent:

UNITED STATES PATENTS

| Number | Name | Date |
| --- | --- | --- |
| 1,389,386 | Seymour | Aug. 30, 1921 |
| 1,855,838 | Kranick | Apr. 26, 1932 |
| 2,030,031 | Innes | Feb. 4, 1936 |
| 2,405,688 | Crumb | Aug. 13, 1946 |

FOREIGN PATENTS

| Number | Country | Date |
| --- | --- | --- |
| 1,389,386 | France | Aug. 30, 1921 |